(12) United States Patent
Otsu et al.

(10) Patent No.: US 10,990,085 B2
(45) Date of Patent: Apr. 27, 2021

(54) MACHINE-TOOL-STATE DETERMINATION SYSTEM AND MACHINE-TOOL-STATE DETERMINATION METHOD

(71) Applicant: HITACHI, LTD., Tokyo (JP)

(72) Inventors: Kenji Otsu, Tokyo (JP); Keiji Watanabe, Tokyo (JP); Hisanori Matsumoto, Tokyo (JP)

(73) Assignee: HITACHI, LTD., Tokyo (JP)

(*) Notice: Subject to any disclaimer, the term of this patent is extended or adjusted under 35 U.S.C. 154(b) by 97 days.

(21) Appl. No.: 16/447,611

(22) Filed: Jun. 20, 2019

(65) Prior Publication Data
US 2020/0026262 A1    Jan. 23, 2020

(30) Foreign Application Priority Data
Jul. 18, 2018   (JP) .............................. JP2018-134608

(51) Int. Cl.
G05B 19/418   (2006.01)
G06K 9/62   (2006.01)
G06N 20/00   (2019.01)

(52) U.S. Cl.
CPC ..... G05B 19/4184 (2013.01); G05B 19/4183 (2013.01); G06K 9/6218 (2013.01); G06N 20/00 (2019.01)

(58) Field of Classification Search
CPC ............................................... G05B 19/4184
(Continued)

(56) References Cited

U.S. PATENT DOCUMENTS

| 6,604,013 B1* | 8/2003 | Hamidieh ......... G05B 19/4065 |
| | | 700/174 |
| 2004/0179915 A1* | 9/2004 | Hill ..................... G05B 19/406 |
| | | 409/131 |

(Continued)

FOREIGN PATENT DOCUMENTS

| DE | 695 26 507 T2 | 9/2002 |
| EP | 0 776 464 B1 | 4/2002 |

(Continued)

OTHER PUBLICATIONS

Lever et al., "Points of significance: Principal component analysis", Jul. 2017, Springer Nature, vol. 14 No. 7, p. 641-642. (Year: 2017).*

(Continued)

*Primary Examiner* — Hien D Khuu
(74) *Attorney, Agent, or Firm* — Volpe Koenig

(57) ABSTRACT

A machine-tool-state determination system configured to determine a state associated with a machine tool including a rotation mechanism for processing a member, the system including: a sensor configured to acquire a state value from the machine tool; and an analysis device, in which the analysis device: performs spectral analysis with time series data of the state value, to extract a rotational frequency of the rotation mechanism and a harmonic wave to the rotational frequency; calculates a ratio of an amplitude of the rotational frequency to an amplitude of the harmonic wave; generates feature-amount data including the state value and the ratio as feature amounts; performs clustering with the feature-amount data; and determines a state associated with the machine tool, based on a result of the clustering.

6 Claims, 15 Drawing Sheets

(58) Field of Classification Search
USPC .......................................................... 700/18
See application file for complete search history.

(56) References Cited

U.S. PATENT DOCUMENTS

| | | | |
|---|---|---|---|
| 2008/0033695 A1* | 2/2008 | Sahara | G01H 1/003 |
| | | | 702/185 |
| 2014/0039665 A1 | 2/2014 | Schneider et al. | |
| 2014/0288882 A1* | 9/2014 | Nakasu | G05B 19/4065 |
| | | | 702/183 |
| 2017/0293862 A1* | 10/2017 | Kamiya | G06N 3/0445 |
| 2018/0164757 A1* | 6/2018 | Matsushima | G05B 13/027 |
| 2018/0181105 A1* | 6/2018 | Shindou | B23Q 17/0995 |
| 2018/0246494 A1* | 8/2018 | Nakahama | G05B 19/182 |
| 2018/0264613 A1* | 9/2018 | Tamai | G06N 20/00 |

FOREIGN PATENT DOCUMENTS

| | | |
|---|---|---|
| EP | 2 676 174 B1 | 4/2017 |
| WO | 2013/031353 A1 | 3/2013 |

OTHER PUBLICATIONS

German Office Action dated Dec. 9, 2020 for German Patent Application No. 102019117684.0.

* cited by examiner

| ID | APPARATUS ID | SEGMENT ID | CUTTING FORCE [N] | AMPLITUDE [N] | RATIO |
|---|---|---|---|---|---|
| 1 | xx1 | No1_Seg1 | 506.2862 | 687.5947 | 0.1428 |
| ... | ... | ... | ... | ... | ... |
| k | xx1 | No1_Segk | 696.3511 | 696.3511 | 0.1370 |
| k+1 | xx2 | No2_Seg1 | 1053.3461 | 380.7843 | 0.0540 |
| ... | ... | ... | ... | ... | ... |

MACHINE-TOOL-STATE DETERMINATION SYSTEM AND MACHINE-TOOL-STATE DETERMINATION METHOD

CLAIM OF PRIORITY

The present application claims priority from Japanese patent application JP 2018-134608 filed on Jul. 18, 2018, the content of which is hereby incorporated by reference into this application.

BACKGROUND OF THE INVENTION

1. Field of the Invention

The present invention relates to a method of determining a state of a machine tool provided with a rotation mechanism.

2. Description of the Related Art

A machine tool that processes a member such as metal includes a rotation mechanism such as a motor, and has a plurality of cutting blades. For example, a rotary tool having a plurality of blades is attached to the rotation mechanism.

Occurrence of abnormality such as machine vibration, blade wear, blade chipping, and blade breakage during a machining operation degrades the quality of a product produced from the member. Thus, there is a demand for a technique of quickly detecting occurrence of an abnormality or predicting an abnormality. For such a demand, there has been known a technique disclosed in International Publication No. 2013/031353.

International Publication No. 2013/031353 discloses a processing-abnormality detection method including: "measuring the amount of cutting state accompanying processing in which a cutting tool is rotated; extracting, from a measured signal, a cutting-force component containing a fundamental wave and a harmonic wave; calculating a threshold for abnormal determination, on the basis of a harmonic wave ratio that is the ratio of the fundamental wave to the harmonic wave in cutting-force component; calculating a cutting force from the extracted cutting-force component; and determining an abnormality, on the basis of the calculated cutting force and the calculated threshold".

SUMMARY OF THE INVENTION

A plurality of abnormality types such as machine vibrations, blade wear, and blade breakage exists in occurrence of abnormality in machining operations. The method disclosed in International Publication No. 2013/031353 is incapable of classifying a type of abnormality.

The conventional technique requires verification of a processed member, for evaluation of the process accuracy or evaluation of the suitability of parameters set in a machine tool. As a result, there may also be a disadvantage an evaluations as described above comes at a high cost.

That is, the conventional technique art is difficult to accurately grasp a state associated with the machine tool.

An object of the present invention is to build a system and method of accurately grasping a state associated with a machine tool.

The following is a representative example of the invention disclosed in the present application. That is, a machine-tool-state determination system configured to determine a state associated with a machine tool including a rotation mechanism for processing a member, the system including: a sensor configured to acquire a state value from the machine tool; and an analysis device including a processor and a memory connected to the processor, in which the analysis device: performs spectral analysis with time series data of the state value, to extract a rotational frequency of the rotation mechanism and a harmonic wave to the rotational frequency; calculates a ratio of an amplitude of the rotational frequency to an amplitude of the harmonic wave; generates feature-amount data including the state value and the ratio as feature amounts; performs clustering with the feature-amount data; and determines a state associated with the machine tool, based on a result of the clustering.

According to the present invention, a state associated with a machine tool can be grasped accurately. Problems, configurations, and effects except those described above will be apparent from the description of an embodiment to be described later.

DESCRIPTION OF THE PREFERRED EMBODIMENTS

Figure 1:
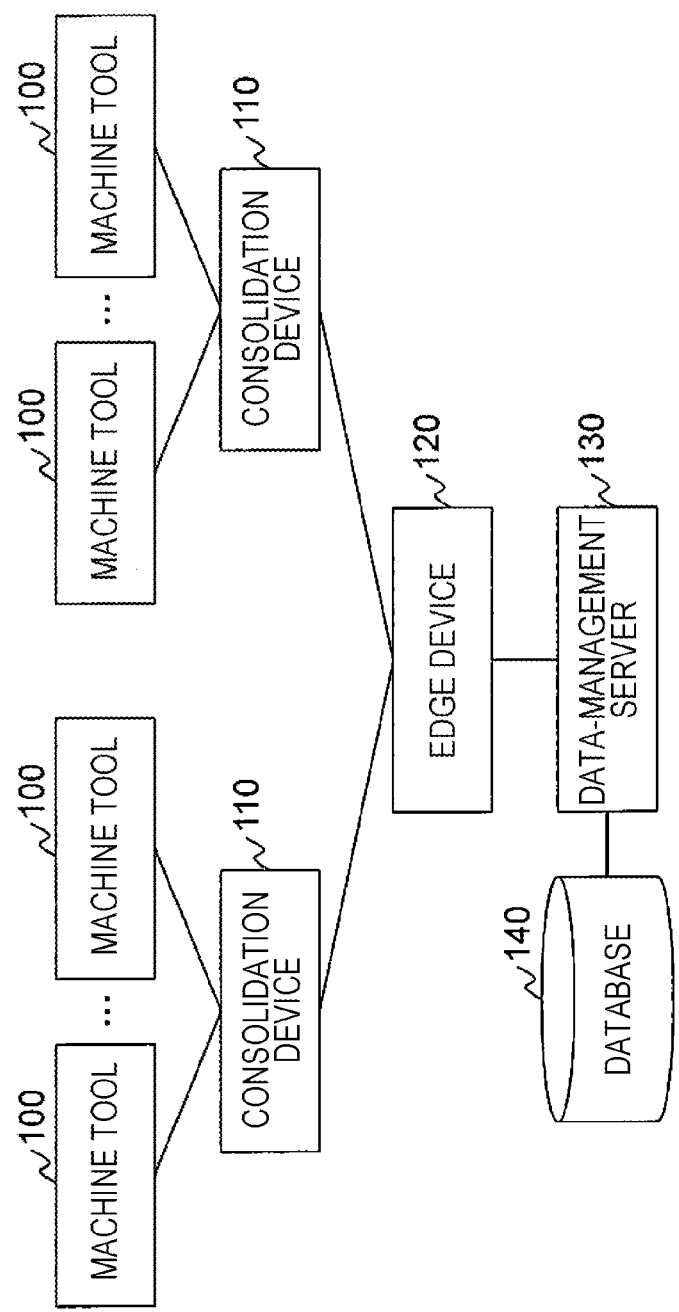
FIG. 1 is an illustration of an exemplary configuration of a system according to a first embodiment.

An embodiments of the present invention will be described below with reference to the drawings. The present invention, however, should not be interpreted as being limited to the details of description of the embodiment to be described below. It will be understood by those skilled in the art that the specific configurations can be changed without departing from the idea or gist of the present invention.

In the configurations of the invention described below, the same or similar configurations or functions are denoted by the same reference signs, and the redundant description will be omitted.

The representation such as "First", "second", or "third", in the present specification and the like is denoted in order to identify the constituent elements, and is not necessarily limited to the number or order.

The respective positions, sizes, shapes, ranges, and the like of the constituents illustrated in the drawings and the like may not represent actual positions, sizes, shapes, ranges, and the like, in order to facilitate understanding of the invention. Accordingly, the present invention is not limited to the positions, sizes, shapes, ranges, and the like disclosed in the drawings and the like.

First Embodiment

FIG. 1 is an illustration of an exemplary configuration of a system according to a first embodiment.

The system includes a plurality of machine tools 100, a plurality of consolidation devices 110, an edge device 120, a data-management server 130, and a database 140.

The plurality of machine tools 100 is connected, directly or through a network, to the plurality of the consolidation devices 110, respectively. Each of the plurality of consolidation devices 110 connects to the edge device 120 directly or through a network. The edge device 120 connects to the data-management server 130 directly or through a network. The data-management server 130 connects to the database 140 directly or through a network.

Note that the present invention is not limited to the type of network. Examples of the network include a local area network (LAN) and a wide area network (WAN). In addition, the connection method of the network may be either wired or wireless.

Each of the machine tools 100 is an apparatus that processes a member such as metal. It is assumed that the machine tool 100 of the present embodiment includes a rotation mechanism for processing members. Examples of the machine tool 100 including the rotation mechanism include a cutting machine and a polishing machine. The present invention is applicable to, any of cutting such as for milling, turning, and drilling.

In the first embodiment, there is assumed a cutting machine with a process tool 204 (see FIGS. 2A to 2E) having a plurality of cutting blades for milling attached to a rotation mechanism. The details of the configuration of the machine tool 100 according to the first embodiment will be described with reference to FIGS. 2A to 2E.

Each of the consolidation devices 110 acquires sensor data from sensors 203 (see FIGS. 2A to 2E) installed at the machine tool 100. The consolidation device 110 generates feature-amount data from the sensor data acquired from each of machine tools 100, and transmits the generated feature-amount data to the edge device 120. The details of the configuration of the consolidation device 110 will be described with reference to FIG. 3.

The edge device 120 uses the feature-amount data of each of the machine tools 100 to perform clustering, and then analyzes a state associated with the machine tool 100, on the basis of the result the clustering. Furthermore, the edge device 120 transmits information such as the feature-amount data, the result of the clustering, and the result of the state analysis to the data-management server 130. The details of the configuration of the edge device 120 will be described with reference to FIG. 4.

The data-management server 130 manages various types of information in the system. The data-management server 130 stores the information acquired through the edge device 120, in the database 140. The data-management server 130 may be a general-purpose computer including a processor, a memory, and a network interface.

The database 140 stores various types of information. The database 140 is achieved with, for example, a storage system including a controller, a storage device, and a network interface. The storage device may be a hard disk drive (HDD), a solid state drive (SSD), or the like.

FIGS. 2A, 2B, 2C, 2D, and 2E each illustrate an exemplary configuration of the machine tool 100 according to the first embodiment.

The machine tool 100 according to the first embodiment performs, for example, milling. In this case, as input conditions for cutting, there are given as parameters: axial depth $a_p$ (mm); radial depth $a_e$ (mm); cutting speed $V_c$ (m/min); feed speed $F_z$ (mm/min); number of revolutions/rotational speed N (rpm); degree of C-axis movement C (degree); cutting method (Up process/Down process); number of scans p; height H (mm); cutting-fluid amount (3 L/min); and end mill diameter D (mm). The cutting-fluid amount is not included for dry process.

For feedback of a diagnostic result, the user changes any of the number of revolutions, the feed speed, the cutting, and the cutting speed among the parameters described above.

Furthermore, in the system, sampling frequency $f_s$ (Hz), window function w, and window data length n are set as parameters for acquiring data (measured value) by each of the sensors 203. Examples of the window function include rectangular window, Hanning window, Hamming window, and Blackman window. The window data length represents the data length of each segment. In the first embodiment, 10 kHz is set as the sampling frequency, and the Hanning window is set as the window function.

Various input parameters such as process condition, tool specification, machine specification, and work specification are given as inputs, in addition to the above parameters.

The machine tool 100 includes a housing 200 and a control device 250. The housing 200 is a part where machining operations are performed, and includes a headstock 201, a main spindle 202, sensors 203, a process tool 204, and a table 205.

The table 205 on which a member 206 to be processed is placed moves the member 206. The headstock 201 moves the main spindle 202 toward the member 206. The main spindle 202 rotates the process tool 204. The process tool 204 cuts the member 206. The process tool 204 has two or more blades for cutting the member 206.

The sensors 203 each measure a value (state value) associated with a machining operation. For example, the sensor 203 measures, as a state value, the rotational speed of the main spindle 202, a force that the process tool 204 receives from the member 206, or the like. The sensor 203 outputs sensor data including the measured state value and identification information on the machine tool 100. The sensor data may include a time stamp indicating the time at which the state value is measured.

Examples of the sensor 203 include: a force sensor (tool dynamometer); an accelerometer; a displacement sensor; a gyro sensor; an ultrasonic sensor; a strain gauge; a laser Doppler vibrometer (LDV); a temperature sensor; a noise meter; and a camera.

The physical quantity measured by the sensor 203 is, for example, force for a force sensor (tool dynamometer), acceleration for an accelerometer, displacement for a displacement sensor, angular velocity for a gyro sensor, strain for a strain gauge, velocity for an LDV, temperature for a temperature sensor, sound pressure for a noise meter, and an image for a camera. Note that, an expert may be able to determine an abnormality of the machine tool 100 on the basis of the difference in sound. Thus, it is effective to measure the sound or the vibration instead of the sound, as the physical quantity.

In addition, a micro electro mechanical systems (MEMS) sensor can also be used as the sensor 203. Various MEMS sensors have advantages in terms of low cost resulting from mass production that is enabled due to semiconductor processes, and minor effects on the process conditions and process accuracy due to the installation of the sensors 203 because the MEMS sensors are small and lightweight from a few millimeters to a dozen or so millimeters.

The sensors 203 may be the same type of sensors or may be a combination of different types of sensors. In addition, data of the voltage or current of the machine tool may be output and used. Utilization of voltage data or current data facilitates signal synchronization, and the accuracy of discrimination is expected to improve with use of a plurality of sensors in combination.

Figure 2A:
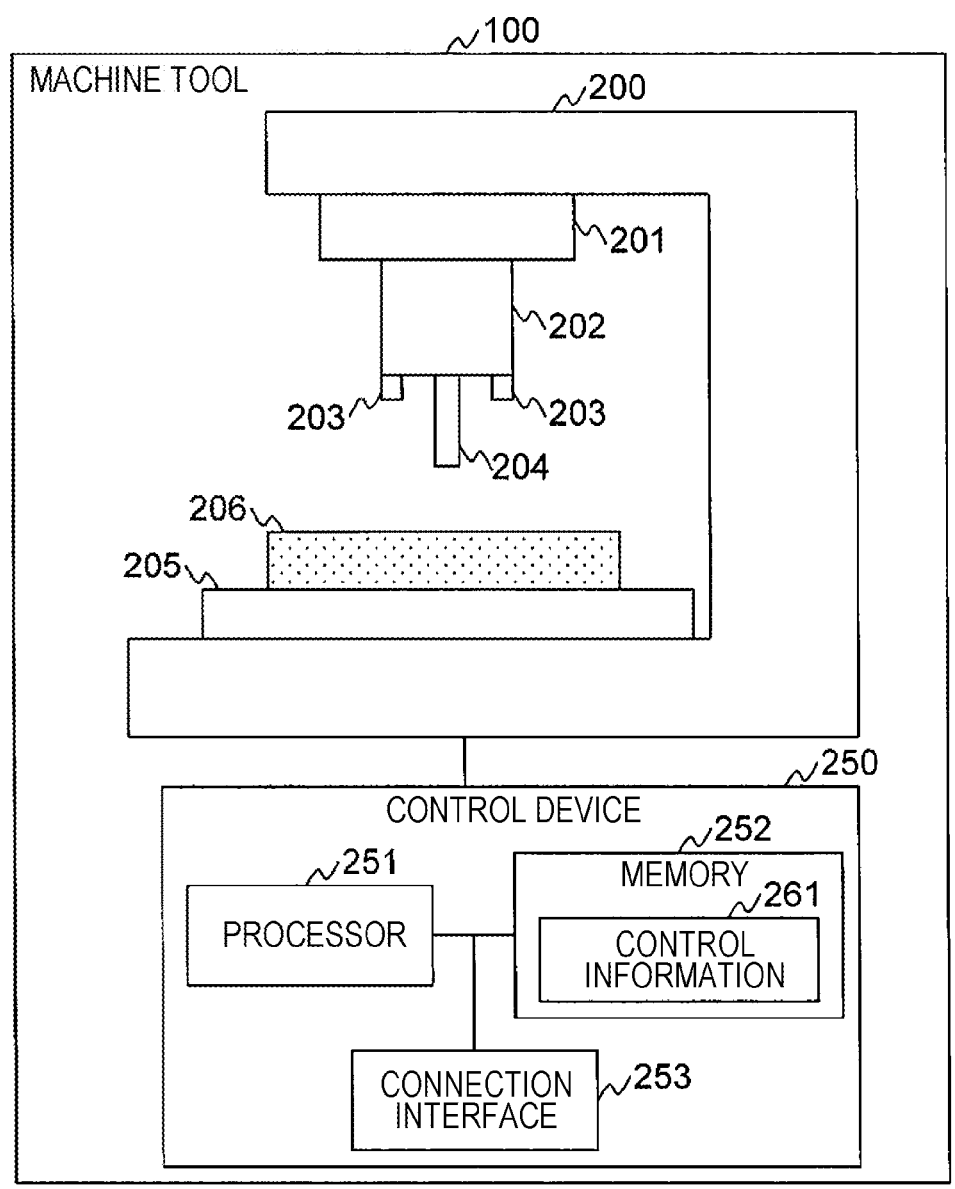
FIG. 2A is an illustration of an exemplary configuration of a machine tool according to the first embodiment.
Figure 2B:
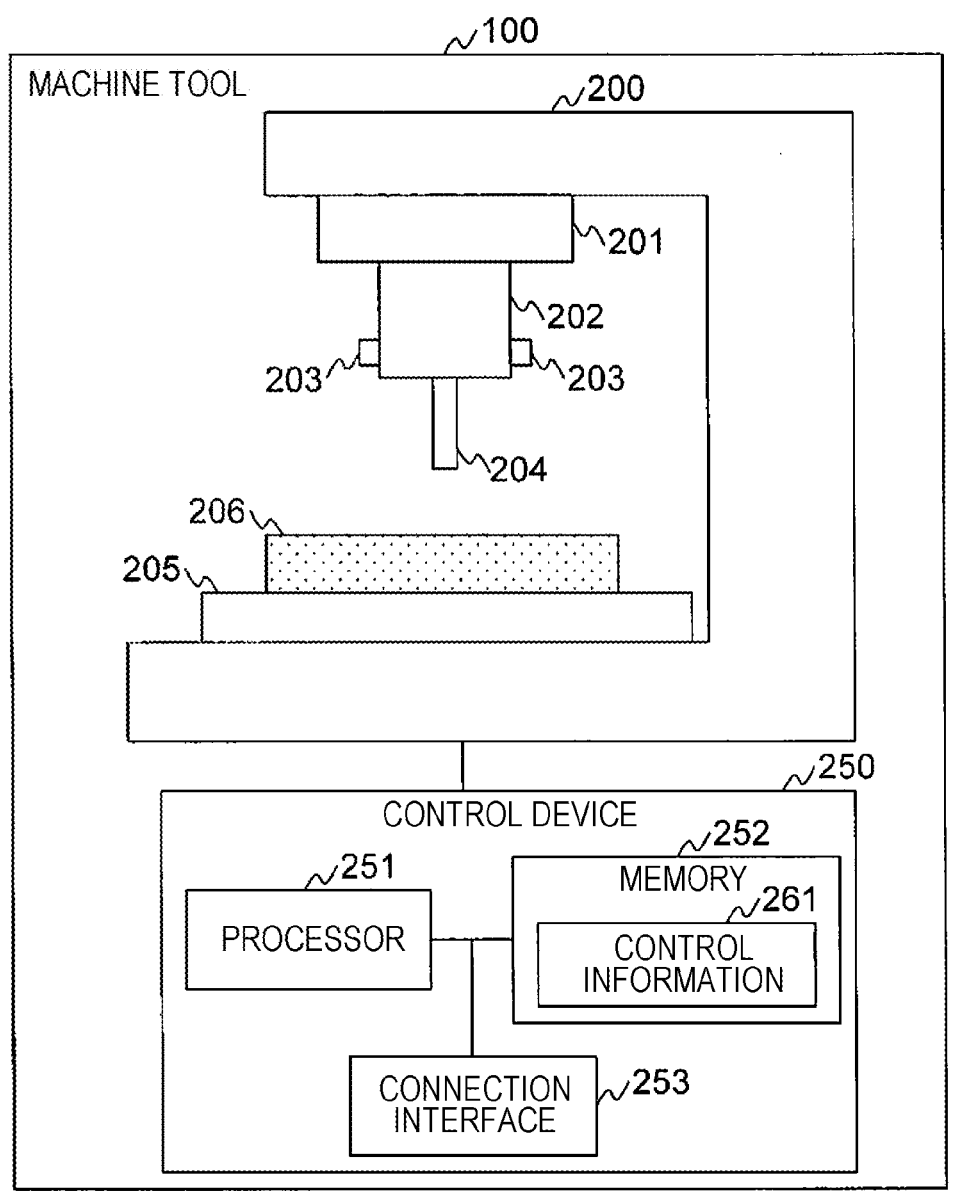
FIG. 2B is an illustration of an exemplary configuration of the machine tool according to the first embodiment.
Figure 2C:
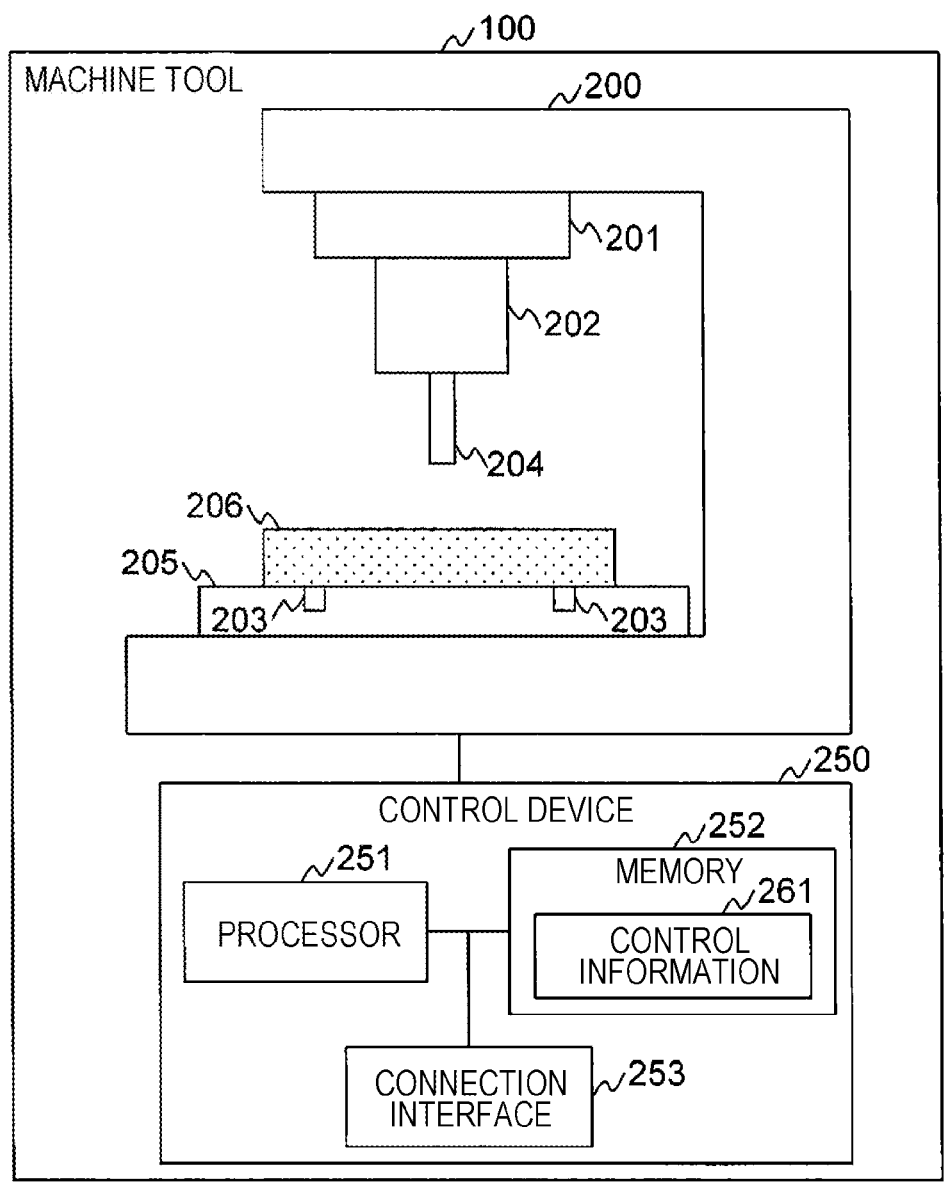
FIG. 2C is an illustration of an exemplary configuration of the machine tool according to the first embodiment.

The installation position of each sensor 203 is not limited to the respective installation positions of the sensors 203 as illustrated in FIGS. 2A, 2B, and 2C. As illustrated in FIG. 2C, for installation of the sensor 203 at the table 205, the sensor 203 may be installed embedded in the table 205 or may be installed on a side face of the table 205. The installation of the sensor 203 as described above disallows the sensor 203 to be in contact on the spindle side. Thus, change in process conditions and the like due to the installation of the sensor 203 can be inhibited. In particular, embedding of the sensor 203 in the table 205 allows the sensor 203 to directly measure the force and vibration transmitted in machining operations. Thus, the accuracy of the measured values can be expected to improve.

Figure 2D:
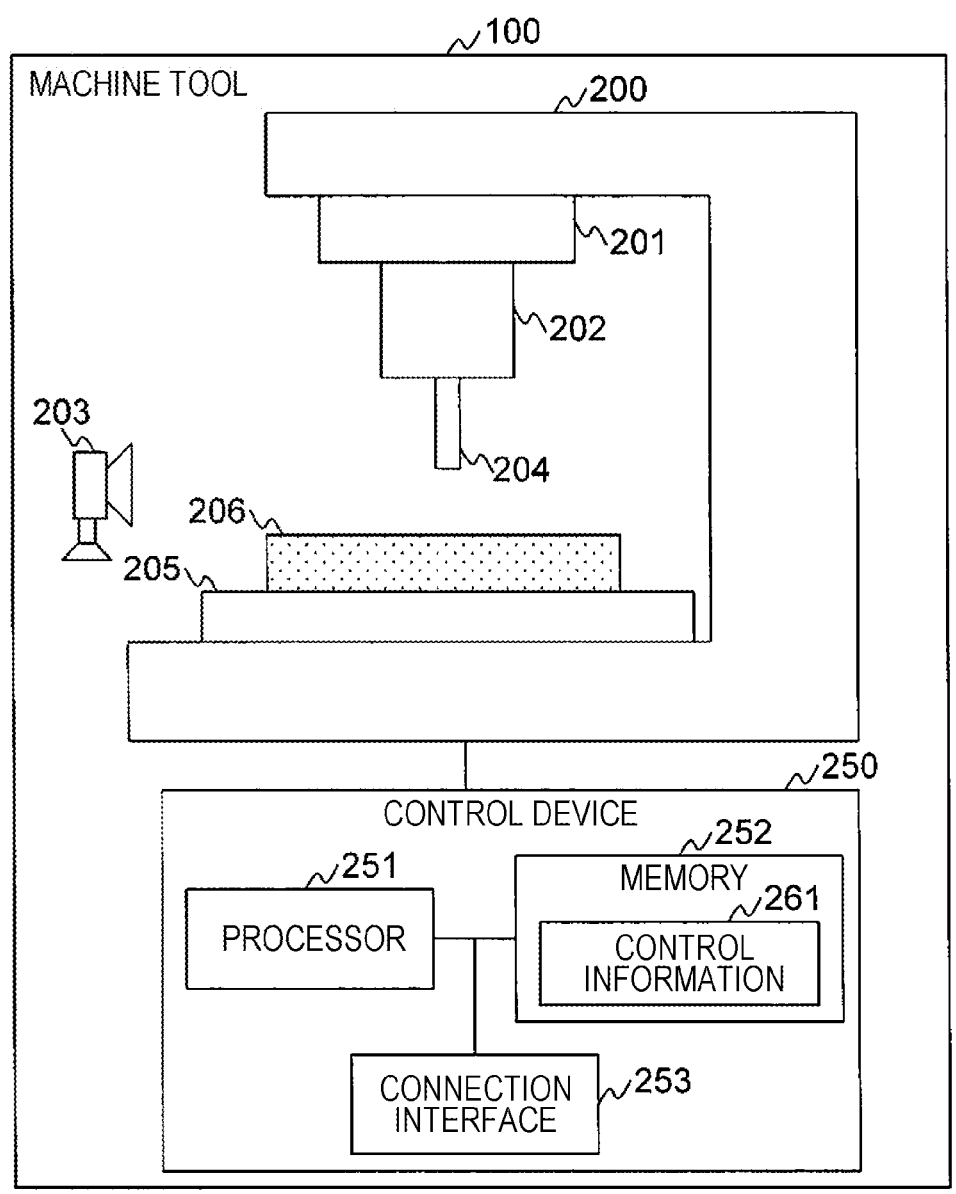
FIG. 2D is an illustration of an exemplary configuration of the machine tool according to the first embodiment.
Figure 2E:
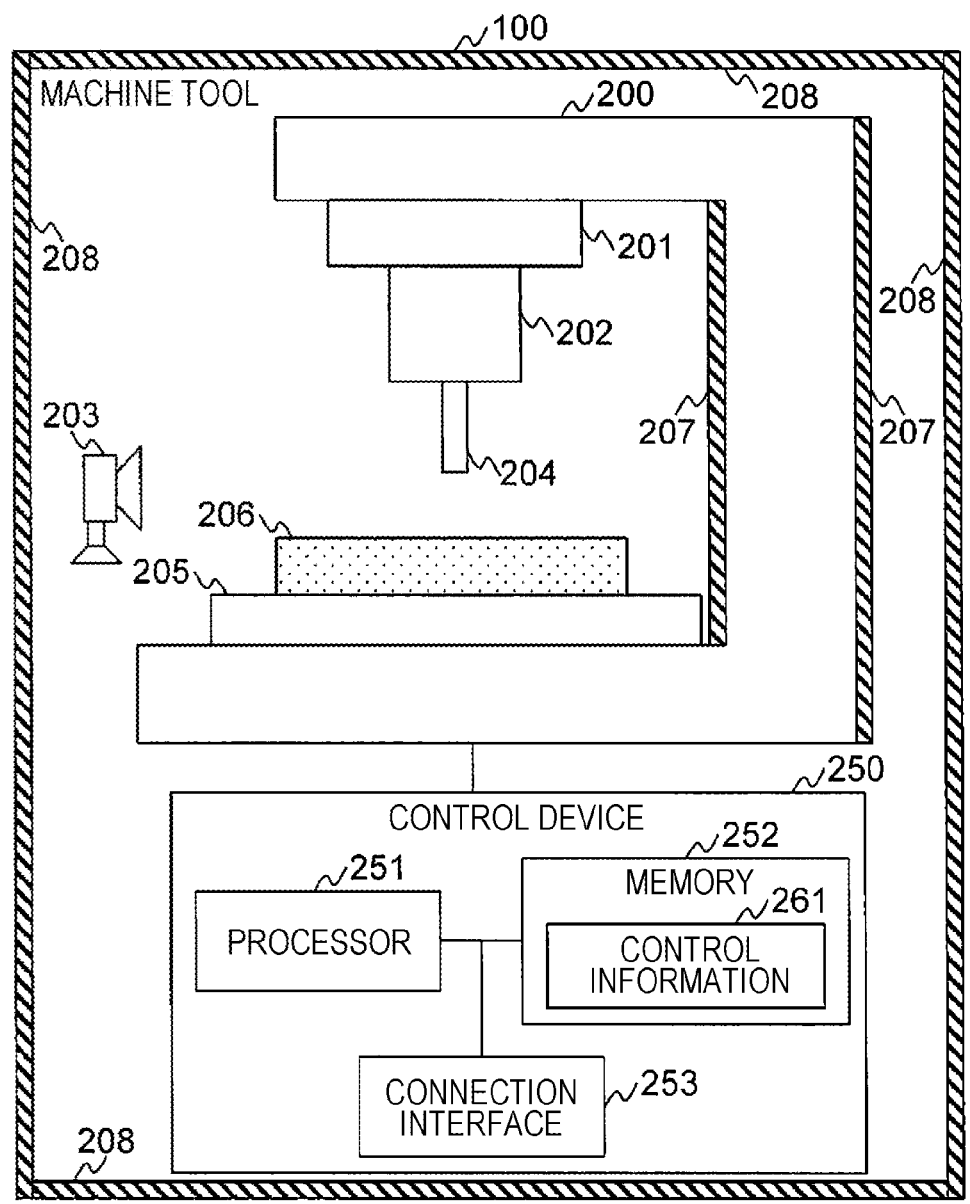
FIG. 2E is an illustration of an exemplary configuration of the machine tool according to the first embodiment.

Furthermore, as illustrated in FIGS. 2D and 2E, for a sensor 203 that measures, for example, a laser, an ultrasonic wave, and a sound, the sensor 203 may not be directly installed at the housing 200. Such indirect installation allows the state of the machine tool 100 in machining operations to be monitored without changing the housing 200. That is, measured values are insusceptible to the influence of change in process conditions and the like due to the installation of the sensor 203.

For a noise meter as the sensor 203, the sensor 203 measures a sound emitted from the machine tool 100. For a laser as the sensor 203, the sensor 203 measures a value indicating the dynamic vibration characteristic of the machine tool 100.

For a noise meter as the sensor 203, the sensor 203 measures a sound propagating directly from a sound source, a reflected sound propagating from a wall face, a sound in which the above described two sounds interfere with each other, and the like. A large influence of the reflected sound complicates or brings difficulty in signal processing on which the sound propagating directly separates from the reflected sound or the interfered sound.

Thus, the installation position of the sensor 203 is adjusted so as not to generate a standing wave between the sensor 203 and the wall face. Furthermore, as illustrated in FIG. 2E, in order to reduce the reflected sound, the entire machine tool 100 is surrounded with an acoustic absorption material 208, or an acoustic absorption material 207 is installed at the housing 200. With this arrangement, the reflection of sound from the wall face can be reduced, thereby allowing the measurement accuracy of the sensor 203 to improve. Examples of the acoustic absorption material 207 and 208 include urethane, glass wool, rubber, and a metallic acoustic absorption board.

It is assumed that the sensor 203 according to the first embodiment measures, as state values, a force (cutting force) and a rotational speed in a specific direction generated in cutting operations, respectively. More specifically, the sensor 203 measures the respective physical quantities of components in the X direction, the Y direction, and the Z direction.

The control device 250 controls each constituent of the housing 200. The control device 250 includes a processor 251, a memory 252, and a connection interface 253 serving as the pieces of hardware, respectively. The pieces of the hardware of the control device 250 each are connected mutually through an internal bus.

The processor 251 executes programs stored in the memory 252. The processor 251 executes processing in accordance with each program to operate as a module that achieves a specific function. In the following description, description of processing with a module as a subject indicates that the processor is in execution of a program for achieving the module.

Note that the module can be also integrally formed as one module in a combination of a plurality of modules, or in division of one module into a plurality of modules for each function.

The memory 252 stores the programs executed by the processor 251 and information used by the programs. The memory 252 stores programs (not illustrated) each for achieving a module that controls each constituent of the housing 200, and stores control information 261. The control information 261 stores parameters for controlling each of the constituents of the housing 200.

The connection interface 253 serves an interface that makes connection with the housing 200 and other devices. Examples of the connection interface 253 include a network interface and an I/O interface.

Note that, FIGS. 2A, 2B, 2C, 2D, and 2E each illustrate the exemplary configuration of the machine tool 100 that performs milling. The present invention, however, is not limited to the machine tool 100 that performs milling. For example, the present invention is also applicable to a machine tool 100 that rotates the member 206 side to perform a process (turning process).

Figure 3:
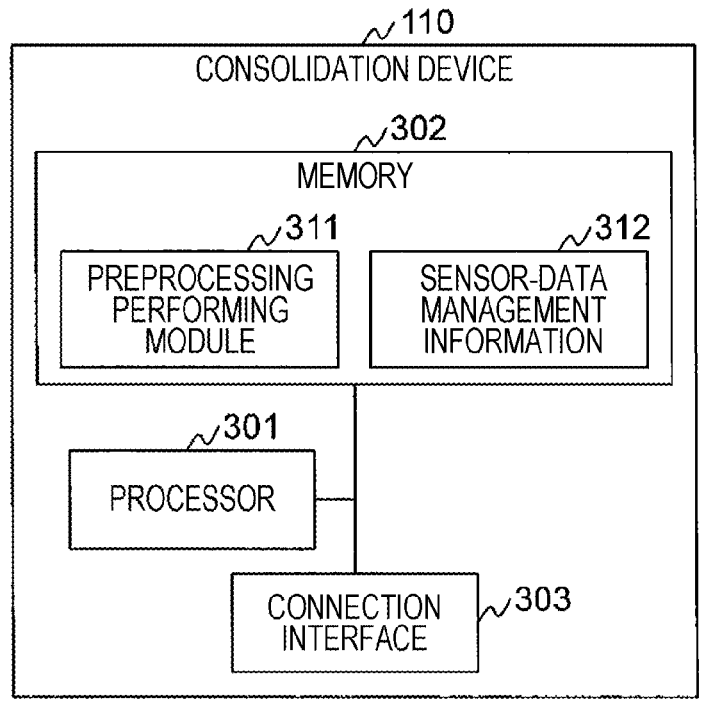
FIG. 3 is a block diagram of an exemplary configuration of a consolidation device according to the first embodiment.

FIG. 3 is a block diagram of an exemplary configuration of the consolidation device 110 according to the first embodiment.

The consolidation device 110 includes a processor 301, a memory 302, and a connection interface 303 serving as the pieces of hardware, respectively. The pieces of the hardware of the consolidation device 110 each are connected mutually through an internal bus. The processor 301, the memory 302, and the connection interface 303 are the pieces of the hardware similar to the processor 251, the memory 252, and the connection interface 253, respectively.

The consolidation device 110 may include a storage device, an input device, and an output device. Examples of the input device include a keyboard, a mouse, and a touch panel; and examples of the output device include a display and a printer.

The memory 302 stores a program for achieving the preprocessing performing module 311 and sensor-data management information 312.

The sensor-data management information 312 is information for managing sensor data acquired from the sensor 203 of the machine tool 100. The sensor-data management information 312 is, for example, information in a tabular format in which one piece of sensor data is managed as one entry.

Note that the present invention is not limited to the data structure of the sensor-data management information 312. For example, the sensor-data management information 312 may be information in an XML format or a CSV format.

The preprocessing performing module 311 generates feature-amount data to be used in clustering, from sensor data. The details of the processing performed by the preprocessing performing module 311 will be described with reference to FIG. 6.

Figure 4:
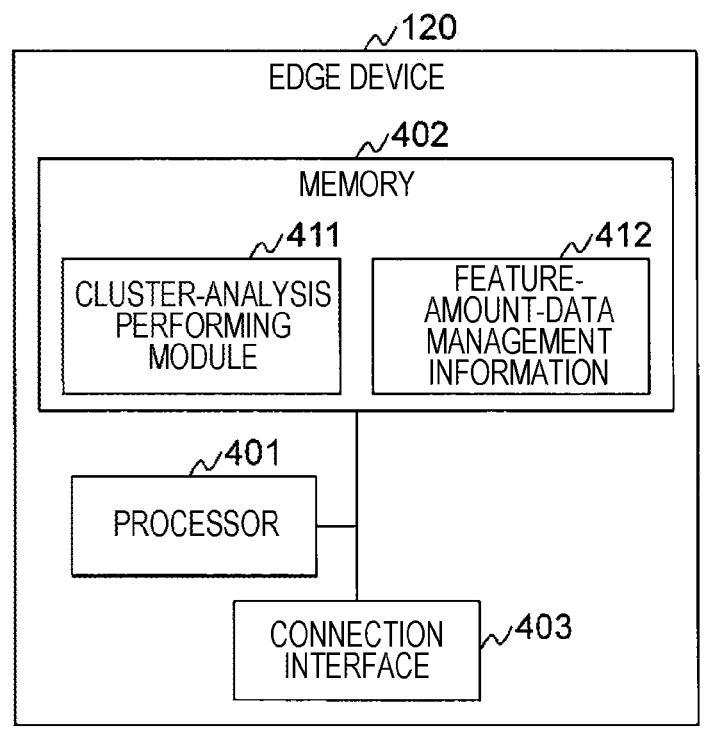
FIG. 4 is a block diagram of an exemplary configuration of an edge device according to the first embodiment.

FIG. 4 is a block diagram of an exemplary configuration of the edge device 120 according to the first embodiment.

The edge device 120 includes a processor 401, a memory 402, and a connection interface 403 serving as the pieces of hardware, respectively. The pieces of the hardware of the edge device 120 each are connected mutually through an internal bus. The processor 401, the memory 402, and the connection interface 403 are the pieces of the hardware similar to the processor 251, the memory 252, and the connection interface 253, respectively.

The edge device 120 may include a storage device, an input device, and an output device. Examples of the input device include a keyboard, a mouse, and a touch panel; and examples of the output device include a display and a printer.

The memory 402 stores a program for achieving a cluster-analysis performing module 411 and feature-amount-data management information 412.

The feature-amount-data management information 412 is information for managing feature-amount data. The details of the data structure of the feature-amount-data management information 412 will be described with reference to FIG. 5.

The cluster-analysis performing module 411 uses the feature-amount data to perform clustering. The details of the processing performed by the cluster-analysis performing module 411 will be described with reference to FIG. 8.

Figure 5:
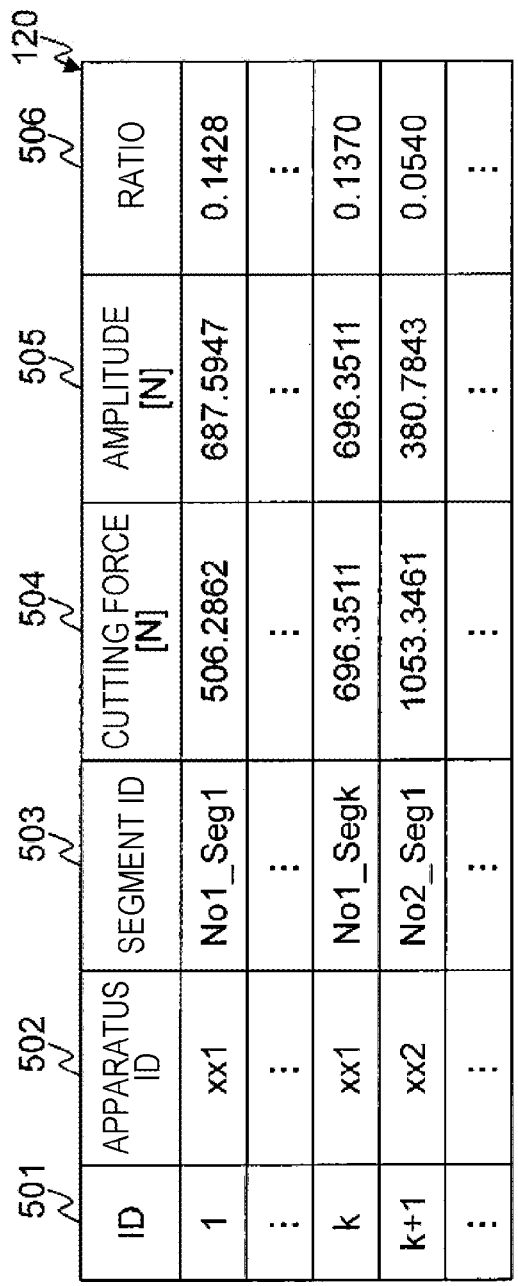
FIG. 5 is a table of an exemplary data structure of feature-amount-data management information according to the first embodiment.

FIG. 5 is a table of an exemplary data structure of the feature-amount-data management information 412 according to the first embodiment.

The feature-amount-data management information 412 stores an entry including an ID 501, an apparatus ID 502, a segment ID 503, a cutting force 504, an amplitude 505, and a ratio 506. One entry corresponds to one piece of feature-amount data.

The ID 501 is a field that stores identification information for uniquely identifying the entry. The apparatus ID 502 is a field that stores identification information for specifying each of the machine tools 100. The segment ID 503 is a field that stores identification information on a short-time width (segment) generated with division of a unit-time width into segments. Here, the unit-time width indicates a time-width for extracting time series data of feature amount. For example, a time-width from the current time to one second before the current time is set as the unit-time width.

The cutting force 504, the amplitude 505, and the ratio 506 are fields that store the feature amount, respectively.

The cutting force 504 is a field that stores a value calculated from cutting forces included in a plurality of pieces of sensor data that belongs to the segment. For example, the root mean square of the cutting forces is stored in the cutting force 504.

The amplitude 505 is a field that stores the amplitude of a frequency matched with or approximate to the frequency of an integral multiple of the fundamental wave, among frequencies calculated with spectral analysis using state values (time series data of state values) included in the plurality of pieces of sensor data that belongs to the segment. There will be described below, as a harmonic wave, a frequency that is an integral multiple of that of the fundamental wave.

Note that approximating to a harmonic wave represents a frequency with an error from the harmonic wave smaller than a threshold.

In the first embodiment, spectral analysis with the time series data of cutting force is performed. In the first embodiment, a rotational frequency is treated as the fundamental wave. The rotational frequency can be calculated on the basis of the rotational speed. Furthermore, the amplitude 505 according to the first embodiment stores the amplitude of a frequency matched with or approximate to a value obtained by multiplying the number of blades of the process tool 204 by the rotational frequency. There will be described below, as a feature harmonic wave, a frequency matched with or approximate to the value obtained by multiplying the number of blades of the process tool 204 by the rotational frequency, among harmonic waves.

The ratio 506 is a field that stores a ratio calculated with the amplitude of the feature harmonic wave and the amplitude of the rotational frequency. The ratio 506 may also store a ratio calculated with the amplitude of a harmonic wave except the feature harmonic wave and the amplitude of the rotational frequency.

The entry may include a field that stores a feature mount different from the respective feature amounts of the cutting force 504, the amplitude 505, and the ratio 506.

Figure 6:
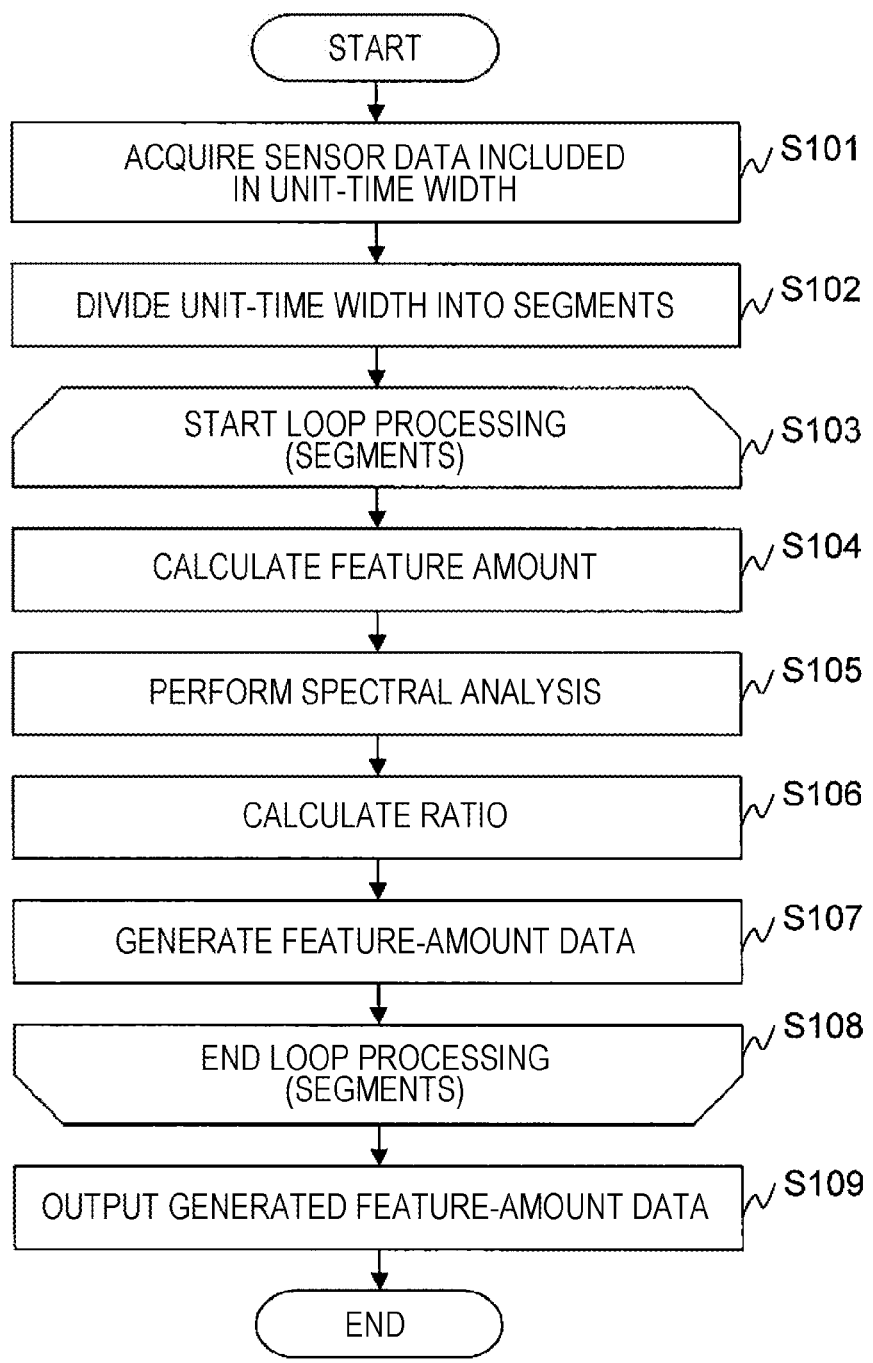
FIG. 6 is a flowchart for describing exemplary processing performed by a preprocessing performing module according to the first embodiment.
Figure 7A:
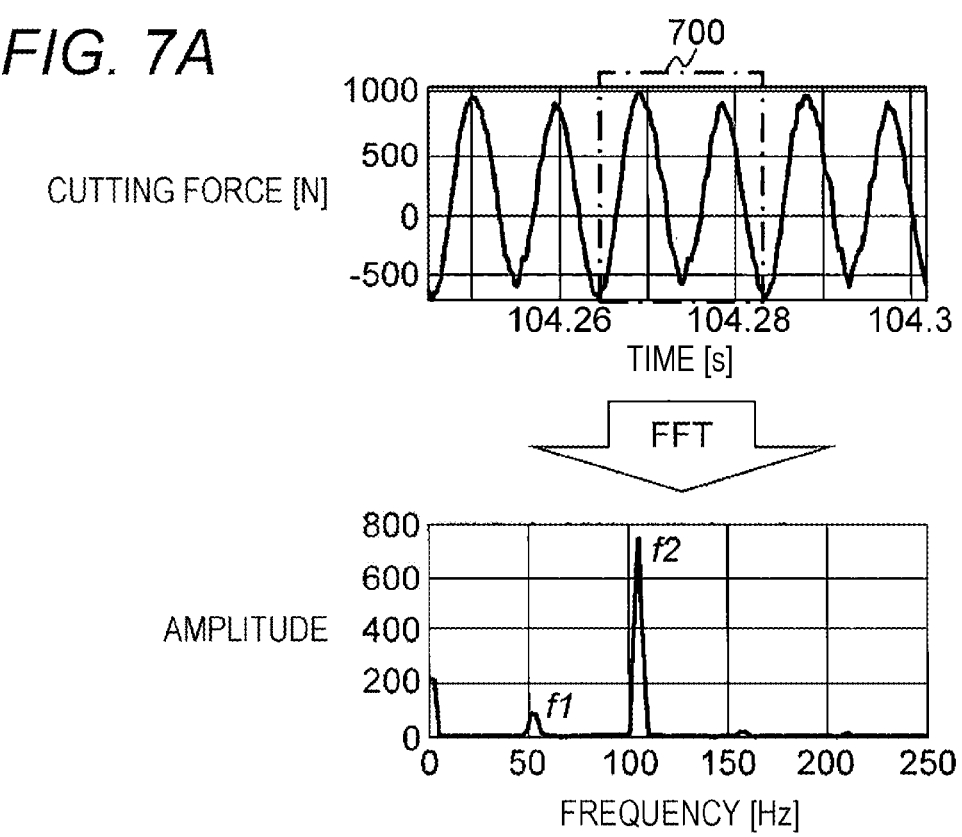
FIG. 7A is a graphical representation of a computation result output of spectral analysis performed by the preprocessing performing module according to the first embodiment.
Figure 7B:
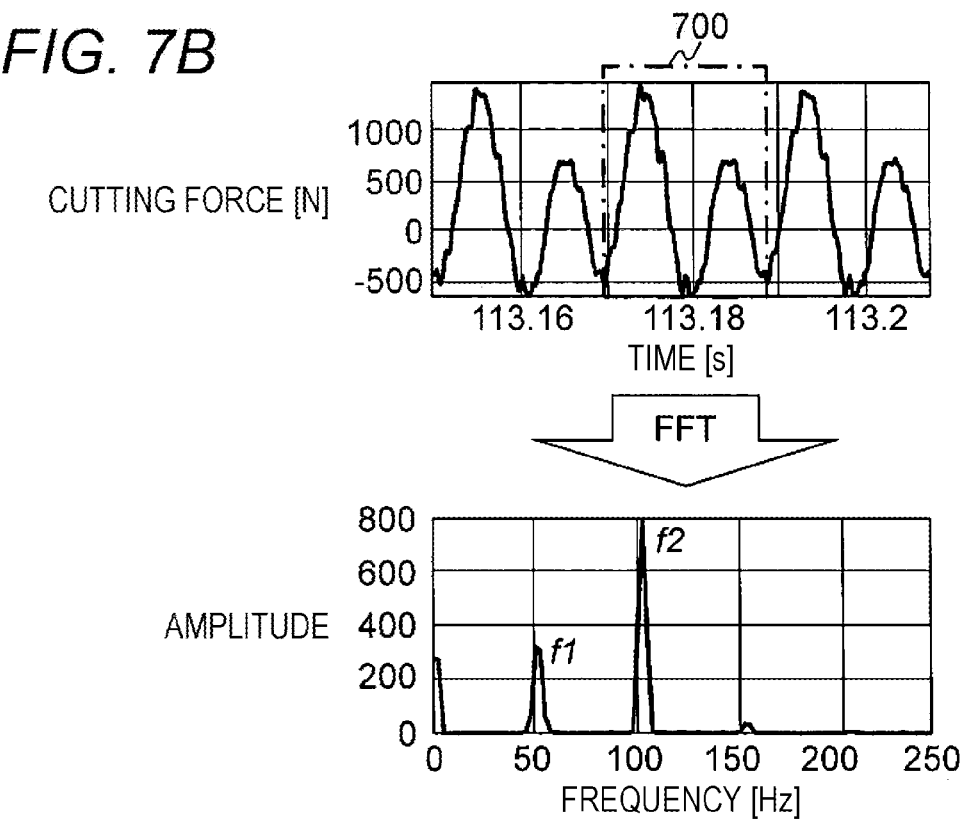
FIG. 7B is a graphical representation of a computation result output of spectral analysis performed by the preprocessing performing module according to the first embodiment.

FIG. 6 is a flowchart for describing exemplary processing performed by the preprocessing performing module 311 according to the first embodiment. Each of FIGS. 7A and 7B is a graphical representation of a computation result output of spectral analysis performed by the preprocessing performing module 311 according to the first embodiment.

The preprocessing performing module 311 performs processing described below when receiving a performance instruction, or periodically.

The preprocessing performing module 311 acquires sensor data included in a unit-time width, from the sensor-data management information 312 (step S101). For example, the preprocessing performing module 311 acquires sensor data having a time stamp included in a unit-time width.

Next, the preprocessing performing module 311 divides the unit-time width into a predetermined number of segments (step S102). The number of segments is assumed to be preset. The number of segments, however, can be updated at any timing.

Next, the preprocessing performing module 311 starts loop processing on the segments (step S103).

Specifically, the preprocessing performing module 311 selects one segment. For example, the preprocessing performing module 311 refers to each of the start point of time of the segments, and selects each segment in order of the old start point of time.

Next, the preprocessing performing module 311 calculates a feature amount with a plurality of pieces of sensor data that belongs to the segment (step S104).

Specifically, the preprocessing performing module 311 calculates the root mean square (RMS) (effective value) of cutting forces included in the plurality of pieces of sensor data that belongs to the segment, as a feature amount.

Note that the preprocessing performing module 311 can use indicators as indicated below, when calculating the feature amount.

<Time Domain>

(Indicators of Size (Position))

Effective value (RMS), average value, median value, mode value, maximum value, and minimum value (Indicators of Variation)

Variance, sum of squares, standard deviation, coefficient of variation, and percentile (Indicators of Distribution)

Skewness and Kurtosis

<Frequency Domain>

(First Fourier Transform (FFT) Spectrum)

Frequency of the fundamental wave and component of the frequency of the integral multiple of the fundamental wave in magnitude, and component ratio to the fundamental wave (Power Spectral Density)

Frequency of the fundamental wave and component of the frequency of the integral multiple of the fundamental wave in magnitude, and component ratio to the fundamental wave The "ratio" herein, however, may be based on the rotational frequency, or may be based on the cutting frequency (rotational frequency×n for n pieces of the blades).

Next, the preprocessing performing module 311 performs spectral analysis for a plurality of pieces of sensor data (time series data of state values) that belongs to the segment (step S105). Specifically, the following processing is performed.

The preprocessing performing module 311 applies a window function to a function representing the time series data of state value, and performs computing a Fourier transform. The preprocessing performing module 311 extracts a frequency regarding a state value, on the basis of the computation result. In the first embodiment, the preprocessing performing module 311 extracts a rotational frequency and a harmonic wave, from the frequencies calculated with the performance of the Fourier transform computation for the time series data of the cutting forces.

In the present specification, a rotational frequency is referred to as f1 and a harmonic wave is referred to as fi, where i represents an integer of 2 or more. In addition, in the present specification, a feature harmonic wave is defined as fN, where N represents the number of blades of the process tool 204.

The preprocessing performing module 311 calculates the ratio of the amplitude of the rotational frequency to the amplitude of the feature harmonic wave, in accordance with Expression (1) (step S106), where Mag (f1) represents the amplitude of the rotational frequency, and Mag (fN) represents the amplitude of the feature harmonic wave.

[Mathematical Expression 1]

$$\frac{Mag(f1)}{Mag(fN)} \quad (1)$$

Note that the preprocessing performing module 311 may calculate the ratio of the amplitude of the rotational frequency to the amplitude of the harmonic wave, in accordance with Expression (2), where n represents an integer corresponding to the extracted highest harmonic wave.

[Mathematical Expression 2]

$$\frac{Mag(f1)}{Mag(fi)} (i = 2, \ldots, n) \quad (2)$$

Spectral analysis performed for a process tool 204 having two blades provided results as illustrated in FIGS. 7A and 7B.

The upper graphs of FIGS. 7A and 7B represent the time series data of cutting forces corresponding to the segments, respectively. More specifically, FIG. 7A indicates the time series data of cutting force acquired from a machine tool 100 in a normal state, and FIG. 7B indicates the time series data of cutting force acquired from another machine tool 100 with chipping on a blade. The lower graphs in FIGS. 7A and 7B represent the spectral analysis results, respectively. A rectangle 700 indicates the time series data of cutting force when the process tool 204 made one rotation.

As indicated in FIGS. 7A and 7B, it can be understood that the amplitude ratio calculated on the basis of the time series data acquired from the other machine tool 100 in the abnormal state differs from the amplitude ratio calculated on the basis of the time series data acquired from the machine tool 100 in the normal state. Note that the amplitude ratio calculated from Expression (1) is an indicator that represents the symmetrical collapse of rotation of a blade.

The ratio of the fn to the integral multiple of the fn is an indicator that mainly reflects tool vibration, and the indicator can also be used as one of the feature amounts.

Thus, in the present invention, the amplitude ratio is treated as an indicator (feature amount) for state classification. Note that a power spectral ratio may be used instead of the amplitude ratio. The processing of step S106 has been described as above.

Next, the preprocessing performing module 311 generates feature-amount data, on the basis of the results of the processing from step S104 to step S106 (step S107).

Specifically, the preprocessing performing module 311 generates feature-amount data including the identification information on the machine tool 100, the identification information on the segment, the effective value of cutting force, the effective value of rotational speed, the rotational frequency, and the amplitude ratio.

Next, the preprocessing performing module 311 determines whether the processing has been completed for all the segments (step S108).

In a case where it is determined that the processing has not been completed for all the segments, the preprocessing performing module 311 returns to step S103.

In a case where it is determined that the processing has been completed for all the segments, the preprocessing performing module 311 outputs the generated feature-amount data to the edge device 120 (step S109), and then ends the processing.

At this time, the edge device 120 updates the feature-amount-data management information 412. Specifically, the edge device 120 adds entries as many as the pieces of feature-amount data that have been received, to the feature-amount-data management information 412, and sets identification information in the ID 501 of the respective added entries. In addition, the edge device 120 sets each value included in the feature-amount data, in the respective fields of the added entries.

Figure 8:
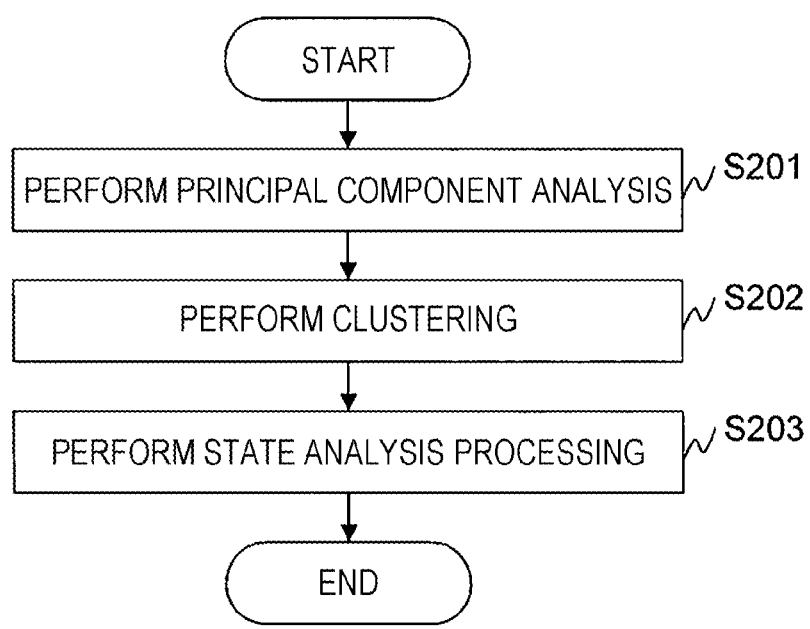
FIG. 8 is a flowchart for describing processing executed by a cluster-analysis performing module according to the first embodiment.
Figure 9:
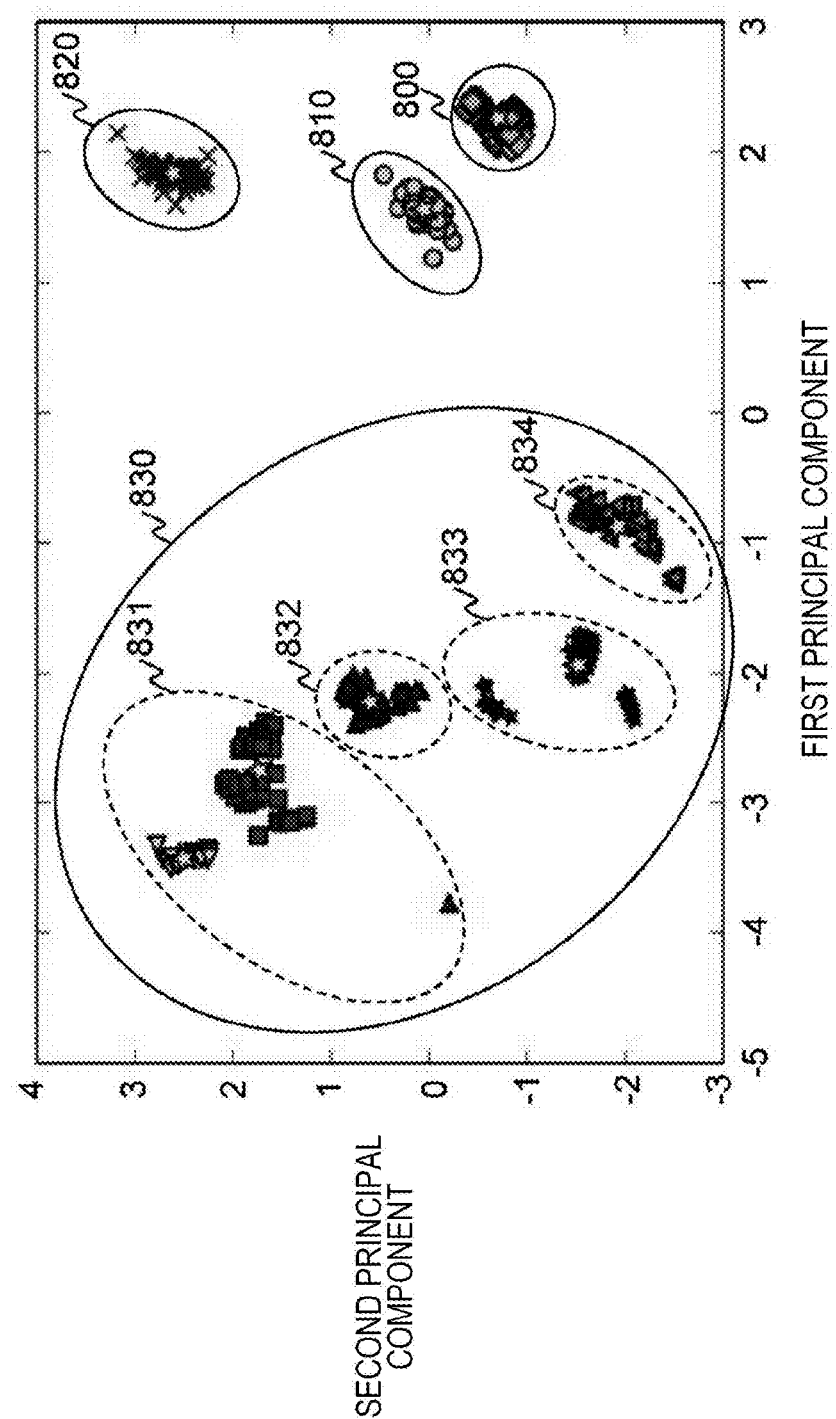
FIG. 9 is a graphical representation of an exemplary result of clustering performed by the cluster-analysis performing module according to the first embodiment.

FIG. 8 is a flowchart for describing the processing performed by the cluster-analysis performing module 411 according to the first embodiment. FIG. 9 is a graphical representation of an exemplary result of clustering performed by the cluster-analysis performing module 411 according to the first embodiment.

The cluster-analysis performing module 411 performs processing described below when receiving a performance instruction, when the feature-amount-data management information 412 is updated, or periodically.

The cluster-analysis performing module 411 performs principal component analysis on the basis of the feature-amount-data management information 412 (step S201). Specifically, the following processing is performed.

The cluster-analysis performing module 411 generates data including d numbers of feature amounts. The cluster-analysis performing module 411 standardizes the feature amounts such that each of the feature amounts has the average value of 0 and the standard deviation of 1. In the first embodiment, the cluster-analysis performing module 411 standardizes data including three feature amounts of the cutting force 504, the amplitude 505, and the ratio 506.

The cluster-analysis performing module 411 calculates a covariance matrix of the standardized data, and further calculates eigenvectors and eigenvalues. The cluster-analysis performing module 411 selects k numbers of the eigenvectors in descending order of the eigenvalues. In the first embodiment, the cluster-analysis performing module 411 selects two eigenvectors.

The cluster-analysis performing module 411 generates a projection matrix, on the basis of the selected eigenvectors. The cluster-analysis performing module 411 applies the projection matrix to a matrix composed of the standardized data. One column of the matrix on which the projection matrix is applied is projection data having the feature-amount data changed.

The above processing converts d-dimensional data into k-dimensional data. That is, the d-dimensional feature amount space is compressed into the k-dimensional feature amount space.

The performance of the principal component analysis on the feature-amount data including the ratio 506 as a feature amount provides, for example, characteristics as described below, to two axes (principal components) included in a two-dimensional feature amount space. A first axis is defined by a linear combination of d-dimensional axes large in weight (weight factor) corresponding to the amplitude. A second axis is defined by a linear combination of d-dimensional axes large in weight (weight factor) corresponding to the amplitude ratio. The processing of step S201 has been described as above.

Next, the cluster-analysis performing module 411 performs clustering with the projection data (step S202).

Examples of the clustering technique that can be considered include, k-means technique, k-means ++ technique, DBSCAN technique, shortest path technique, and Ward's technique. In the first embodiment, clustering with the k-means technique is performed. The clustering is performed on a machine tool 100 basis.

Next, the cluster-analysis performing module 411 performs state analysis processing on the basis of the result of the clustering (step S203). The details of the state analysis processing will be described later. After the state analysis processing, the cluster-analysis performing module 411 ends the processing.

The cluster-analysis performing module 411 outputs the feature-amount data, the result of the clustering, and the result of the state analysis, to the data-management server 130. The data-management server 130 stores the acquired information in the database 140.

Note that, instead of the principal component analysis, a mapping from the d-dimensional feature amount space to the k-dimensional feature amount space may be predefined. In this case, the cluster-analysis performing module 411 performs clustering, on the basis of the vector value or scalar value of the k-dimensional feature amount space calculated with the mapping.

FIG. 9 indicates a specific example of performance result of the clustering according to the first embodiment. As indicated in FIG. 9, four clusters 800, 810, 820, and 830 were generated by the clustering. The cluster 800 includes feature-amount data acquired in a normal state. The cluster 810 includes feature-amount data acquired in a state of occurrence of wear. The cluster 820 includes feature-amount data acquired in a state of occurrence of chipping. The cluster 830 includes feature-amount data acquired in a state of occurrence of vibration abnormality of the process tool 204. Furthermore, the cluster 830 was allowed classification into smaller clusters 831, 832, 833, and 834 according to the process accuracy for the member 206.

As indicated in FIG. 9, it can be understood that the performance of the clustering with the feature-amount data including the ratio of the amplitude of the rotational frequency to the amplitude of the feature harmonic wave as a feature mount allows accurate classification of the states associated with the machine tool 100.

The state analysis processing with the result of the clustering will be described.

(State Analysis Processing 1) Real-time abnormality detection processing can be considered as one state analysis processing.

In order to achieve the real-time abnormality detection processing, learning data is input into the system to generate cluster information as indicated in FIG. 9 in advance. The edge device 120 retains the cluster information as learning information.

The consolidation device 110 generates feature-amount data from the time series data of state values acquired from the machine tool 100, and the edge device 120 generates projection data from the feature-amount data and uses the projection data to perform clustering. The edge device 120 specifies a cluster to which the feature-amount data (projection data) belongs, on the basis of the learning information, and specifies the state of the machine tool 100. That is, the edge device 120 can detect an abnormality of the machine tool 100. The cluster-analysis performing module 411 of the edge device 120 generates and outputs information for displaying the result of the processing. The result of the processing is managed for each machine tool 100.

Figure 10:
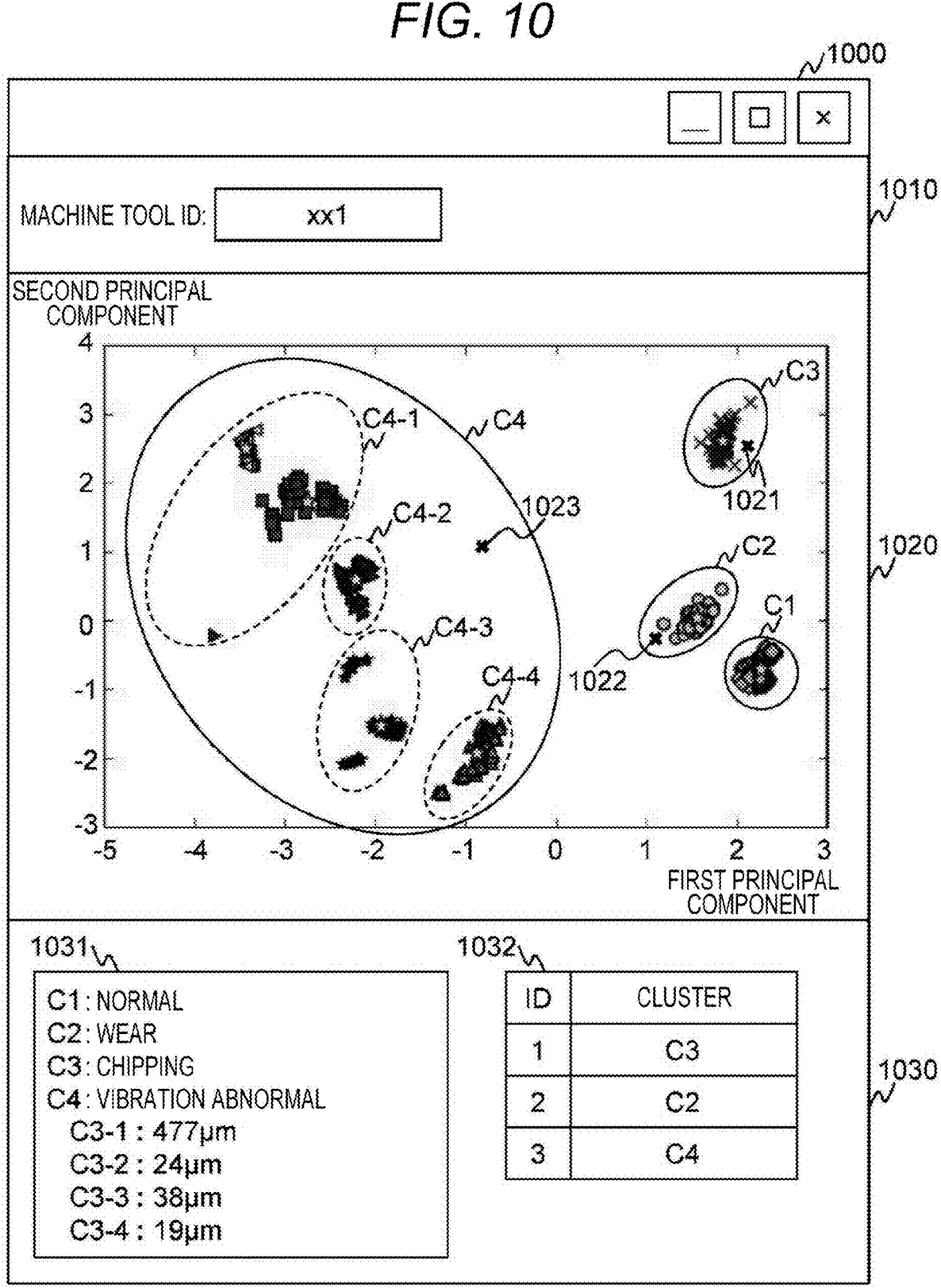
FIG. 10 is an illustration of an exemplary screen displayed in accordance with information generated by the edge device according to the first embodiment.

FIG. 10 is an illustration of an exemplary screen displayed in accordance with information generated by the edge device 120 according to the first embodiment.

A screen 1000 includes a machine-tool selection column 1010, a cluster display column 1020, and a result display column 1030.

The machine-tool selection column 1010 is a column for selecting a machine tool 100 as a display target. The machine-tool selection column 1010 includes a column in which identification information on the machine tool 100 is input.

The cluster display column 1020 is a column in which the classification result of feature-amount data is displayed. Points 1021, 1022, and 1023 indicate the pieces of the classified feature-amount data of the machine tool 100, respectively.

The result display column 1030 includes a cluster-information display column 1031 and a classification result column 1032. The cluster-information display column 1031 is a column in which the cluster information generated with learning data is displayed. The respective numerical values of clusters included in the cluster of vibration abnormality each represent an error of the process accuracy of a member 206. The classification result column 1032 is a column in which a cluster to which the classified feature-amount data belongs is displayed.

Utilization of the system according to the first embodiment allows quick and accurate detection of an abnormality of the machine tool 100.

(State Analysis Processing 2) Evaluation processing on process accuracy can be considered as one state analysis processing. In order to evaluate the process accuracy of the member 206, the user is required to operate the machine tool 100, and further take out the processed member 206 to verify the quality. As a result, there may be a disadvantage that the process accuracy evaluation is costly.

Therefore, the cluster-analysis performing module 411 calculates an indicator such as the number of clusters and the distance between clusters on the basis of a result of the clustering as indicated in FIG. 9, and then calculates an evaluation value with an evaluation function having the indicator as a variable. The cluster-analysis performing module 411 evaluates the process accuracy of the member 206 on the basis of the evaluation value. The cluster-analysis performing module 411 generates and outputs information for displaying the result of the processing.

The distance between clusters is given by, for example, the Euclidean distance in a feature amount space. Furthermore, the cluster-analysis performing module 411 determines, for example, on the basis of the result of comparison between an indicators and a threshold, whether the process accuracy of the member 206 is high or not.

Figure 11:
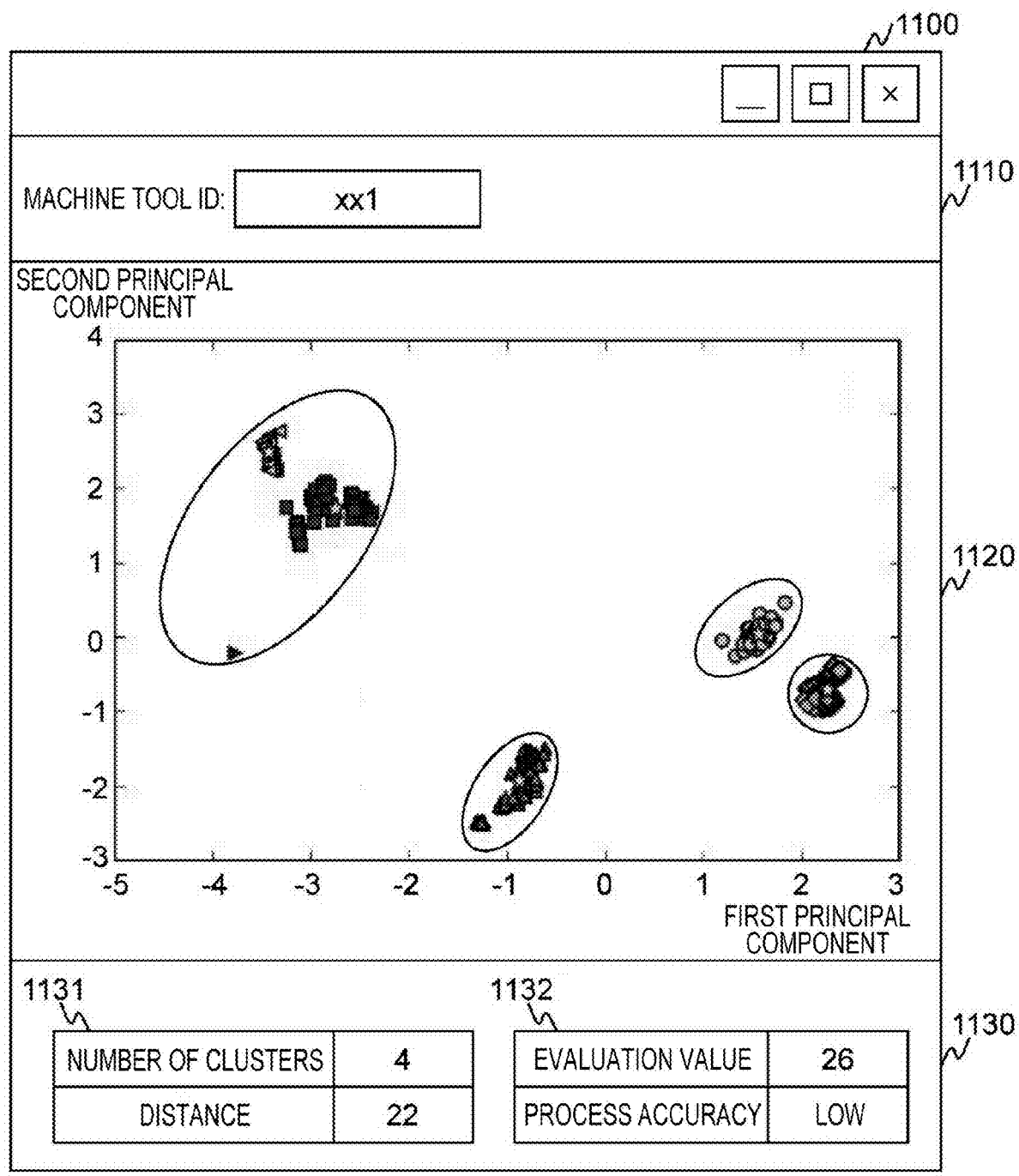
FIG. 11 is an illustration of an exemplary screen displayed in accordance with information generated by the edge device according to the first embodiment.

FIG. 11 is an illustration of an exemplary screen displayed in accordance with information generated by the edge device 120 according to the first embodiment.

A screen 1100 includes a machine-tool selection column 1110, a cluster display column 1120, and an analysis-result display column 1130. The machine-tool selection column 1110 is the same column as the machine-tool selection column 1010.

The cluster display column 1120 is a column in which the result of the clustering with the feature-amount data of the machine tool 100 as the display target is displayed.

The analysis-result display column 1130 includes an indicator display column 1131 and an accuracy evaluation column 1132. An indicator display column 1131 is a column in which the calculated indicator is displayed. The "distance" in the indicator display column 1131 represents the total value of the distance between the respective clusters. The accuracy evaluation column 1132 is a column in which the evaluation value and the evaluation result of process accuracy are displayed.

As illustrated in FIG. 11, it can be understood that the quality of the processed member 206 is uneven for a large number of clusters, or a larger distance between clusters. On the basis of the result of the clustering and the determination result of process accuracy based on the indicators, the user can accurately grasp variation in process accuracy, degradation in process accuracy, and the like.

Utilization of the system according to the first embodiment allows evaluation of the process accuracy, without taking out of the processed member 206 to verify the quality. This utilization allows reduction of the cost required for the process accuracy evaluation.

(State Analysis Processing 3) Evaluation processing on parameters set for each of the constituents of the housing 200 can be considered as one state analysis processing. In order to evaluate parameters, the user is required to set parameters for the constituent of the housing 200 to operate the machine tool 100, and further takes out the processed member 206 to determine whether a desired quality is satisfied. As a result, there may be a disadvantage that the parameter evaluation is costly.

Therefore, the cluster-analysis performing module 411 calculates an indicator such as the number of clusters and the distance between clusters on the basis of a result of the clustering as indicated in FIG. 9, and then calculates an evaluation value with an evaluation function having the indicator as a variable. The cluster-analysis performing module 411 determines whether the parameter that has been set is suitable, on the basis of the evaluation value. The cluster-analysis performing module 411 generates and outputs information for displaying the result of the processing.

The cluster-analysis performing module 411 determines whether the parameter is suitable, on the basis of the result of comparison between the evaluation value and a threshold, for example.

Figure 12:
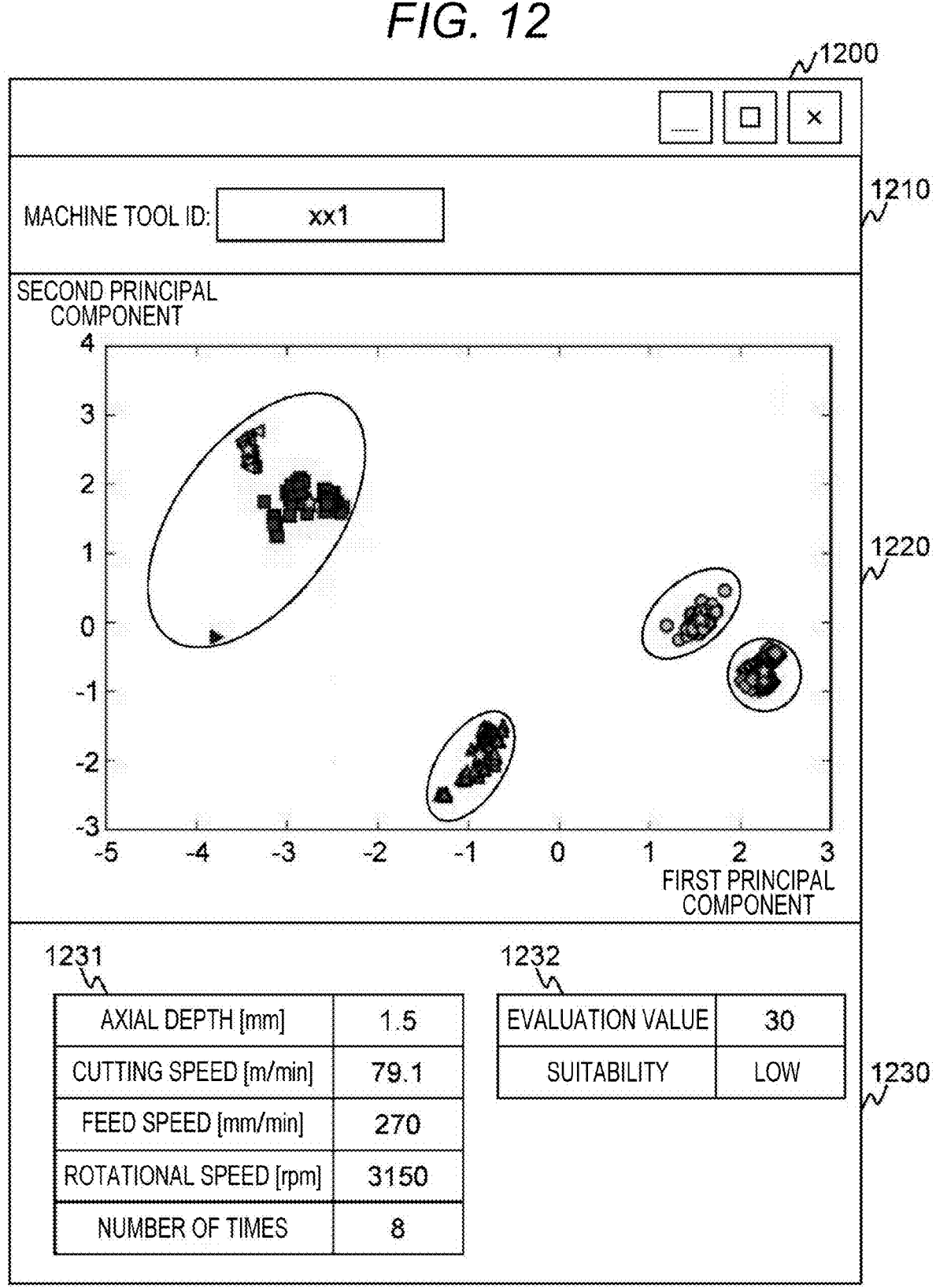
FIG. 12 is an illustration of an exemplary screen displayed in accordance with information generated by the edge device according to the first embodiment.

FIG. 12 is an illustration of an exemplary screen displayed in accordance with information generated by the edge device 120 according to the first embodiment.

A screen 1200 includes a machine-tool selection column 1210, a cluster display column 1220, and an analysis-result display column 1230. The machine-tool selection column 1210 is the same column as the machine-tool selection column 1010. The cluster display column 1220 is the same column as the cluster display column 1120.

The analysis-result display column 1230 includes a parameter display column 1231 and a suitability evaluation column 1232. The parameter display column 1231 is a column in which parameters that each have been set for the machine tool 100 is displayed. The cluster-analysis performing module 411 acquires control information 261 from the machine tool 100 in order to display the parameter in the parameter display column 1231. The suitability evaluation column 1232 is a column in which the evaluation value and the result of parameter evaluation are displayed.

As illustrated in FIG. 12, it can be understood that the quality of the processed member 206 is uneven for a large number of clusters, or a larger distance between clusters. That is, it can be interpreted that the parameter is unsuitable, for a highly uneven quality. Thus, on the basis of the result of the clustering and the result of the parameter evaluation based on the indicators, the user can grasp whether the parameter is suitable.

Utilization of the system according to the first embodiment allows evaluation of the parameter that has been set, without taking out of the processed member 206 to verify the quality. This utilization allows, for example, efficient determination of a parameter for processing an unknown member 206.

Note that the consolidation device 110 and the edge device 120 are separately provided; however, the consolidation device 110 and the edge device 120 may be integrally provided as one device. For example, the system may not include the consolidation device 110. In this case, the functions of the consolidation device 110 are included in the edge device 120.

Note that the edge device 120 may perform part of the processing performed by the consolidation device 110, or the consolidation device 110 may perform part of the processing performed by the edge device 120. For example, the consolidation device 110 may perform principal component analysis and may transmit dimension-reduced sensor data to the edge device 120. In addition, the consolidation device 110 may perform spectral analysis and the edge device 120 may calculate the ratio.

Note that the present invention is not limited to the above described embodiment, and includes various modifications. Furthermore, for example, the above described embodiment has been described in detail of the configuration in order to facilitate description of the present invention, and is not necessarily limited to those having the entire configuration that has been described. Furthermore, additions, eliminations, and replacements of part of the configuration of the embodiment can be made to another configuration.

Furthermore, each of the constituents, functions, processing units, processing devices, and the like described above may be achieved by hardware, for example, with design of part or all of the constituents, functions, processing units, processing devices, and the like as an integrated circuit. Alternatively, the present invention can also be achieved with program code of software for achieving the functions of the embodiment. In this case, a storage medium recording the program code is provided to a computer, and a processor included in the computer reads the program code stored in the storage medium. In this case, the program code itself read from the storage medium achieves the functions of the above described embodiment, and the program code itself and the storage medium storing the program code are included in the present invention. Examples of the storage medium for supplying such program code, that can be used include a flexible disk, a CD-ROM, a DVD-ROM, a hard disk, a solid state drive (SSD), an optical disk, a magneto-optical disk, a CD-R, a magnetic tape, a non-volatile memory card, and a ROM.

In addition, the program code for achieving the functions described in the present embodiment can be implemented with a wide range of programs or script languages such as assembler, C/C++, Python, MATLAB, R, Julia, Perl, Shell, PHP, or Java (registered trademark).

Furthermore, the program code of software for realizing the functions of the embodiment may be distributed through a network to store the program code in a storage device such as a hard disk or a memory of a computer or a storage medium such as a CD-RW or CD-R. Then, a processor included in the computer may read out and execute the program code stored in the storage device or the storage medium.

Furthermore, as control lines and information lines, what are considered to be necessary for description are indicated, and all control lines and information lines are not necessarily indicated for products. All configurations may be connected mutually.

What is claimed is:

1. A machine-tool-state determination system configured to determine a state associated with a machine tool including a rotation mechanism for processing a member, the machine-tool-state determination system comprising: a sensor configured to acquire a state value from the machine tool; a cutting mechanism that cuts the member in cooperation with an operation of the rotation mechanism and has a plurality of blades for cutting the member; and an analysis device including a processor and a memory connected to the processor, wherein the analysis device: performs spectral analysis with time series data of the state value, to extract a rotational frequency of the rotation mechanism and a harmonic wave to the rotational frequency; selects, from the harmonic wave, such a harmonic wave as a difference between the selected harmonic wave and a frequency obtained by multiplying the rotational frequency by the number of blades included in the cutting mechanism is smallest; calculates a ratio of an amplitude of the rotational frequency and an amplitude of the selected harmonic wave; generates feature-amount data including the state value and the ratio as feature amounts; performs principal component analysis with the feature-amount data to select a plurality of principal components; converts the feature-amount data in a feature amount space including axes corresponding to the feature amounts, into data in a feature amount space including axes corresponding to the selected principal components; performs clustering with the converted feature-amount data; determines a state associated with the machine tool, based on a result of the clustering; retains, as learning information, a result of clustering with learning data indicating a normal state and learning data indicating an abnormal state; and compares a result of clustering on feature-amount data newly generated, with the learning information, to detect an abnormality of the machine tool, and wherein the axes corresponding to the plurality of principal components include an axis defined by a linear combination of the axes corresponding to the feature amounts, with the axis corresponding to the ratio being large in weight factor.

2. The machine-tool-state determination system according to claim 1, wherein the analysis device:
   calculates an indicator for evaluating process accuracy of the member, based on a result of the clustering; and
   evaluates the process accuracy of the member, based on the indicator.

3. The machine-tool-state determination system according to claim 1, wherein the analysis device:
   calculates, based on a result of the clustering, an evaluation value for determining whether a parameter for controlling the machine tool is suitable; and
   determines, based on the evaluation value, whether the parameter is suitable.

4. The machine-tool-state determination system according to claim 1,
   wherein the sensor is installed directly at the rotation mechanism of the machine tool or at a constituent different from the rotation mechanism of the machine tool, or is installed in non-contact with the machine tool, and
   the machine-tool-state determination system includes, as the sensor, at least any of a force sensor, a strain sensor, a displacement sensor, a velocimeter, an accelerometer, an angular velocimeter, an acoustic sensor, an ultrasonic sensor, a microphone, a temperature sensor, a laser sensor, and a camera.

5. The machine-tool-state determination system according to claim 1,
wherein the machine tool is housed in a housing, and part of the machine tool or part of the housing includes an acoustic absorption material.

6. A machine-tool-state determination method to be executed by a system that manages a machine tool having a rotation mechanism for processing a member and a cutting mechanism that has a plurality of blades that cuts the member in cooperation with an operation of the rotation mechanism, the system including a sensor configured to acquire a state value from the machine tool, and an analysis device including a processor and a memory connected to the processor, the machine-tool-state determination method comprising: performing spectral analysis with time series data of the state value, to extract a rotational frequency of the rotation mechanism and a harmonic wave to the rotational frequency, with the analysis device; selecting, from the harmonic wave, such a harmonic wave as a difference between the selected harmonic wave and a frequency obtained by multiplying the rotational frequency by the number of blades included in the cutting mechanism is smallest, with the analysis device; calculating a ratio of an amplitude of the rotational frequency to an amplitude of the selected harmonic wave, with the analysis device; generating feature-amount data including the state value and the ratio as feature amounts, with the analysis device; performing principal component analysis with the feature-amount data to select a plurality of principal components, with the analysis device; converting the feature-amount data in a feature amount space including axes corresponding to the feature amounts, into data in a feature amount space including axes corresponding to the selected principal components, with the analysis device; performing clustering with the converted feature-amount data, with the analysis device; determining a state associated with the machine tool, based on a result of the clustering, with the analysis device; retaining, as learning information, a result of clustering with learning data indicating a normal state and learning data indicating an abnormal state; and comparing a result of clustering on feature-amount data newly generated, with the learning information, to detect an abnormality of the machine tool, with the analysis device, and wherein the axes corresponding to the plurality of principal components include an axis defined by a linear combination of the axes, with the axis corresponding to the ratio being large in weight factor.

* * * * *